United States Patent
du Quesne

(10) Patent No.: US 6,182,735 B1
(45) Date of Patent: *Feb. 6, 2001

(54) DEVICE FOR FITTING AND REMOVING A TIRE

(76) Inventor: Francis du Quesne, Kleistraat 138, B-2630 Aartselaar (BE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/169,957

(22) Filed: Oct. 13, 1998

(30) Foreign Application Priority Data

Oct. 14, 1997 (BE) ...................................... 9700819

(51) Int. Cl.[7] .................................................. B60C 25/132

(52) U.S. Cl. ......................................... 157/1.17; 157/1.24

(58) Field of Search .................. 157/1.17, 1.24, 157/1.28

(56) References Cited

FOREIGN PATENT DOCUMENTS

| 91 01 930 | 6/1991 | (DE) . |
| 0 649 763 A1 | 4/1995 | (EP) . |

*Primary Examiner*—James G. Smith
(74) *Attorney, Agent, or Firm*—Bacon & Thomas PLLC

(57) ABSTRACT

A device for fitting and removing a tire to or from a wheel, that works in conjunction with an instrument having a turntable provided with elements for tightening a rim of the wheel, and with a tool which can be positioned at the height of the top edge of the wheel rim that is mounted on the turntable. The device includes a lever with at least one pressure element that can exert pressure on either an upper or lower bead and/or at least one side of the tire. The lever is fixed in a mobile and revolving manner to a support which is fixed in relation to the instrument. The support is connected to the lever by a single coupling system which allows full movement of the lever between a first position in which the pressure element can exert pressure on one of the upper or lower beads or the sides of the tire surrounding a wheel rim mounted on the turntable of the instrument, and a second position in which the pressure element can exert pressure on the other side and/or the sides of said tire.

9 Claims, 5 Drawing Sheets

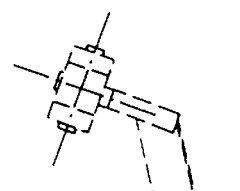
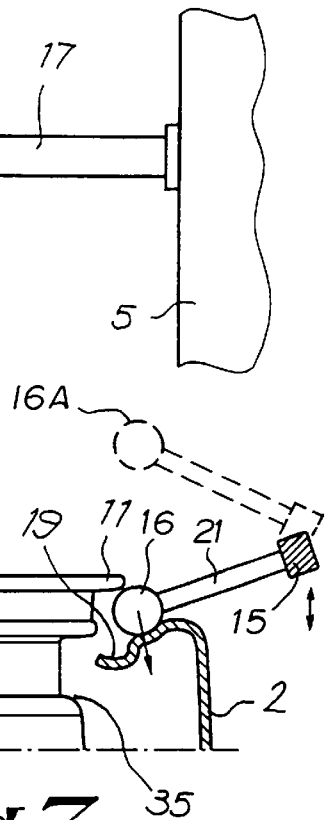
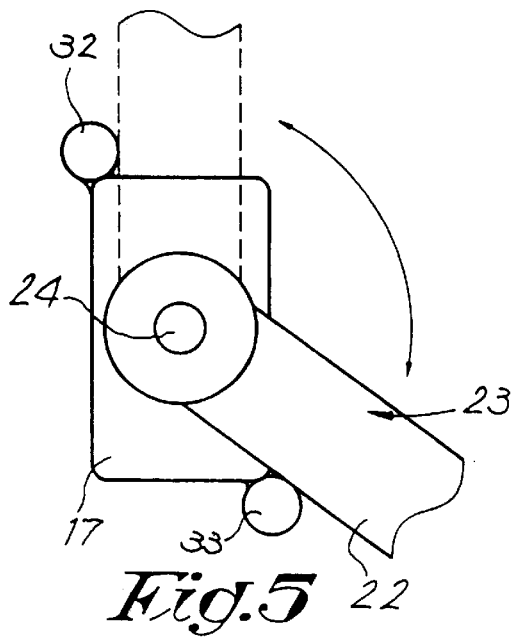
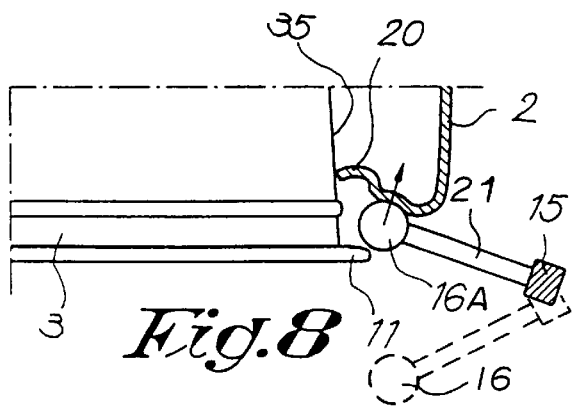

DEVICE FOR FITTING AND REMOVING A TIRE

BACKGROUND OF THE INVENTION

1. Field of the Invention

The present invention concerns a device for fitting and removing a tire on/from a wheel rim, in particular of cars, motor bikes, etc.

In particular, the invention concerns a device to assist in the fitting and removal in case of very rigid tires, for example such as thin sports tires.

2. Description of the Related Art

For fitting and removing tires on/from a wheel rim, known devices are used provided with a turntable containing elements for tightening the wheel and with a support equipped with a tool that can be positioned at the height of the top edge of the wheel rim and containing a part in which can be provided a lever that can be placed between the wheel rim and the tire, as well as a guiding element for the tire.

In order to remove a tire from a wheel rim, it is known that one has to push the tire bead in a conventional outer groove of the wheel rim, after which the above-mentioned lever can be placed between the wheel rim and the tire.

Certain tires, in particular thin sports tires, are disadvantageous in that the sides are very rigid and in that the beads cannot be pushed in said groove without some extra force being exerted.

A device for exerting this extra force is known from document EP 0.649.763 of applicant and comprises a lever provided with a pressure element, whereby this lever is detachable, such that it can be mounted on any of the two supports, so that said pressure element can either rest on the bead and/or the inner side or on the bead and/or the top side of the tire.

Thus, this known device is disadvantageous in that said lever has to be moved from one support to another depending on the bead and/or the side being used, which is not very practical.

SUMMARY OF THE INVENTION

The invention aims a device which does not have said disadvantage.

To this end, the invention concerns a device for fitting and removing a tire to/from a wheel, working in conjunction with an instrument containing a turntable provided with elements for tightening the wheel rim, and with a tool which can be positioned at the height of the top edge of the wheel rim mounted on the table, whereby said device contains a lever with at least one pressure element which makes it possible to exert a pressure on the bead and/or side of the tire, such that the lever is fixed in a mobile manner, in particular in a revolving manner, to a support which is fixed in relation to the instrument, by a unique coupling system which makes it possible to move the lever between a first position in which the pressure element can exert a pressure on one of the beads or sides of a tire surrounding a wheel rim mounted on the table of the above-mentioned instrument, and a second position in which the pressure element can exert a pressure on the other bead and/or side of said tire.

Preferably, the coupling element contains a swivel arm fixed in a revolving manner to the support, whereby the above-mentioned lever contains the pressure element which is in turn linked to the swivel arm in a revolving manner.

The coupling system can be made such that the angle between the rod and the rotating table is different for said two lever positions.

BRIEF DESCRIPTION OF THE DRAWINGS

In order to better explain the characteristics of the invention, the following preferred embodiments are described as an example only, without being limitative in any way, with reference to the accompanying drawings, in which:

FIGS. 4 and 5 are views according to the arrows F4 and F5 in FIG. 2;

FIG. 7 represents a section according to line VII—VII of FIG. 6;

FIG. 8 shows a section according to line VIII—VIII in FIG. 2.

DETAILED DESCRIPTION OF THE PREFERRED EMBODIMENT

Figure 1:
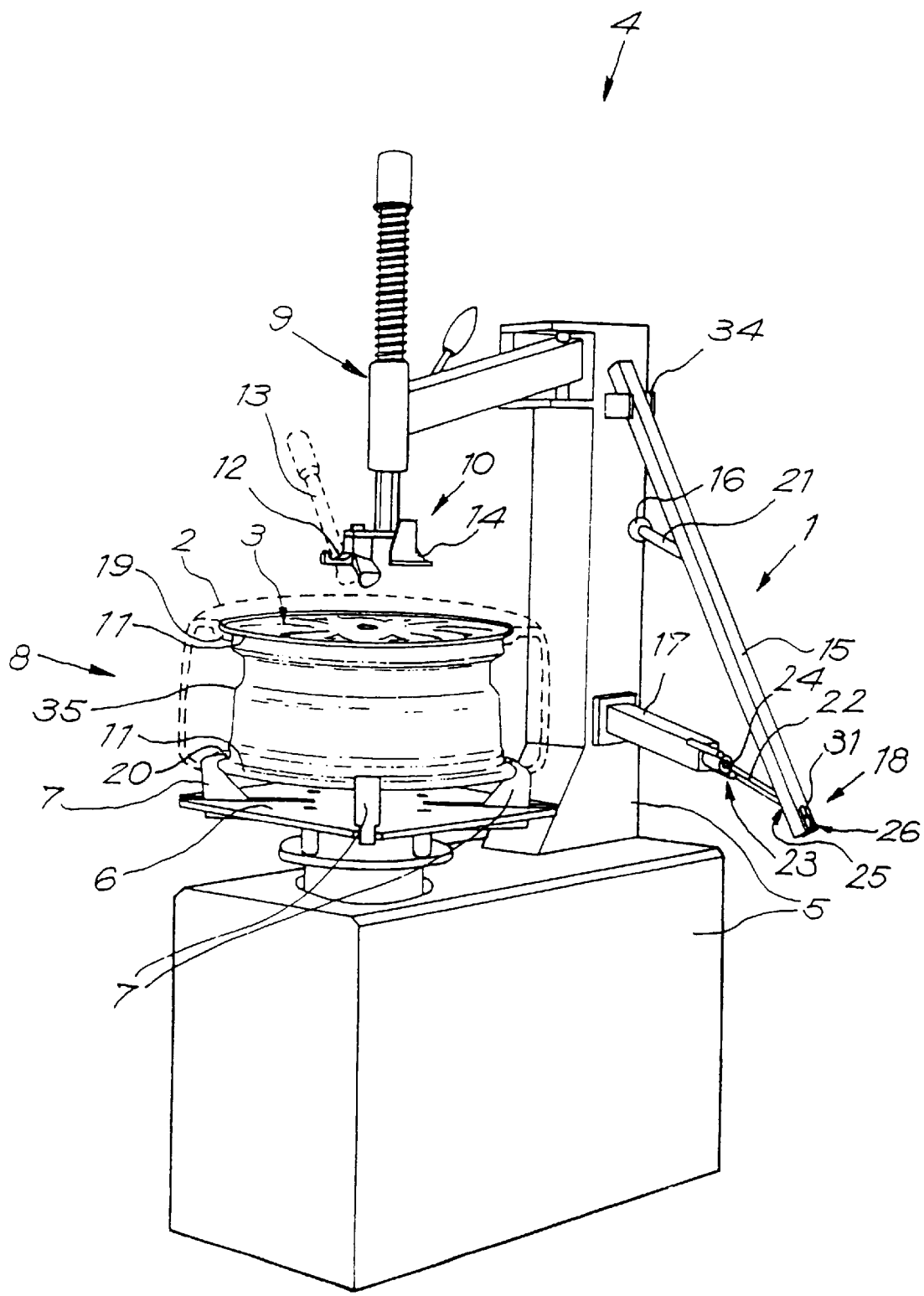
FIG. 1 shows a view in perspective of a device for fitting and removing tires provided with a device according to the invention when in rest.
Figure 2:
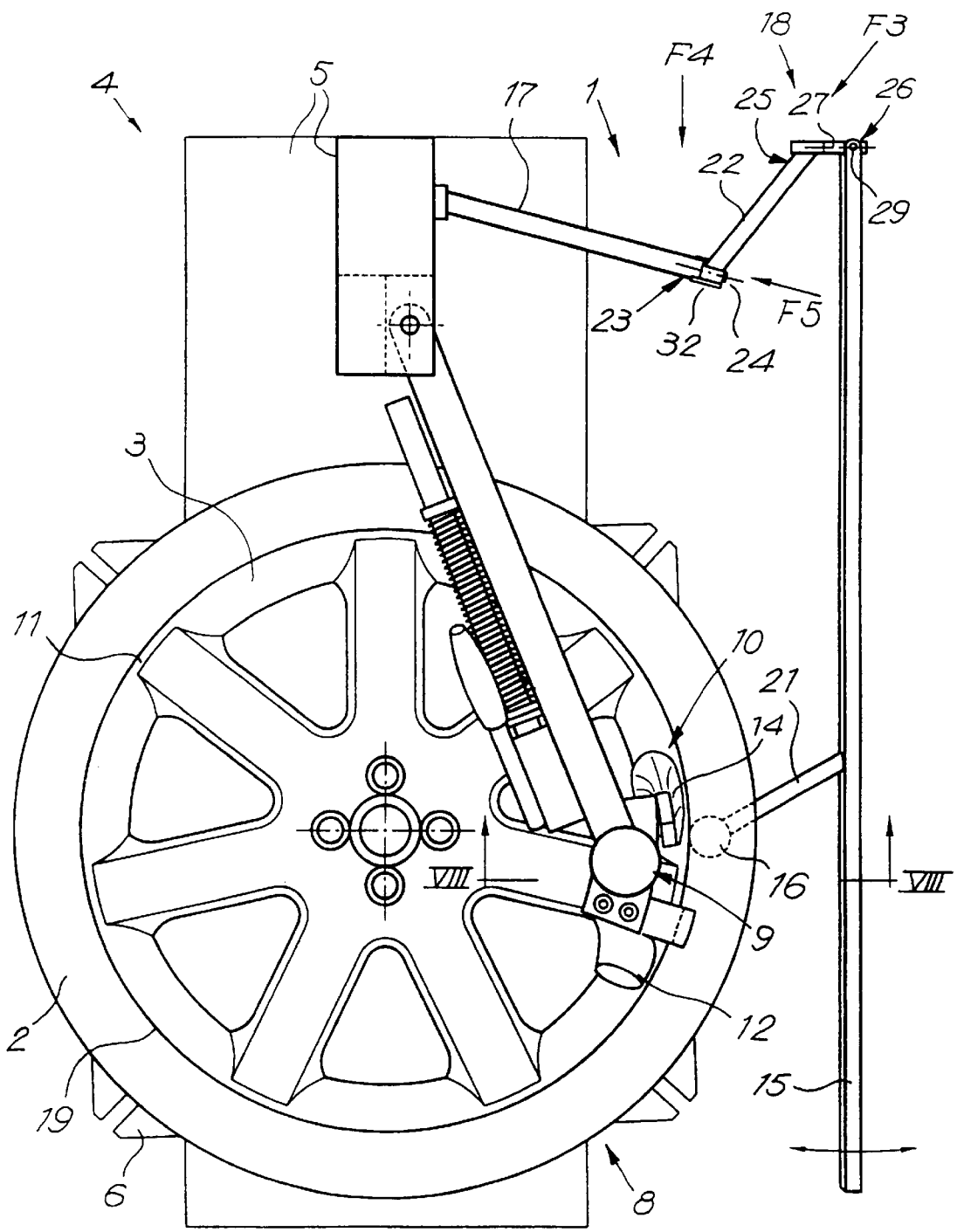
FIG. 2 schematically represents the instrument from FIG. 1 as seen from above, with the device according to the invention in the position in which it can exert a force on the bottom bead of a tire.
Figure 3:
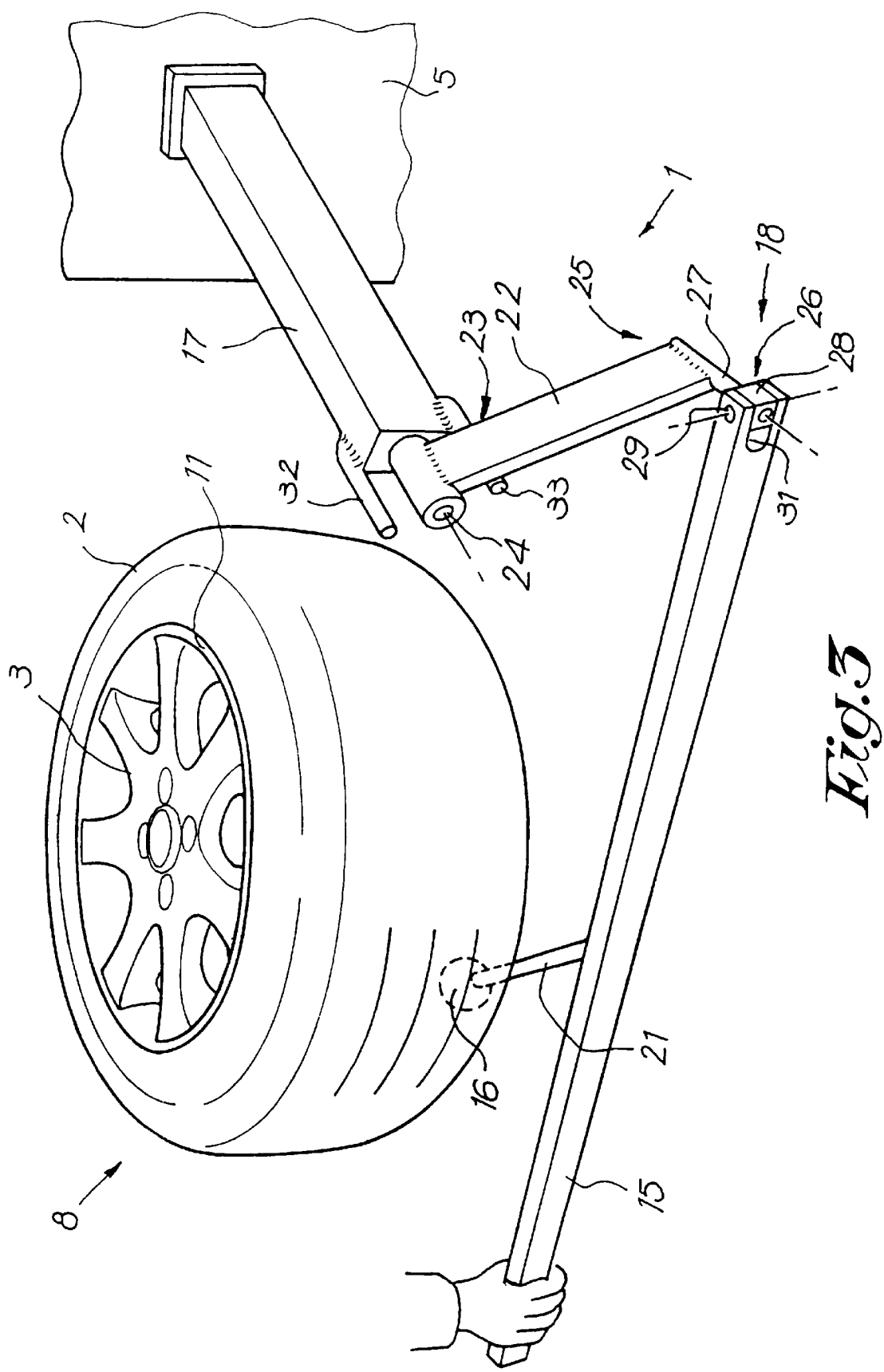
FIG. 3 represents a view in perspective according to arrow F3 in FIG. 2.

The invention concerns a device 1 to assist in fitting a tire 2 on a wheel rim 3 or in removing a tire 2 from a wheel rim 3, whereby this device 1 works in conjunction with a traditional instrument 4 for fitting and removing tires.

This instrument 4 mainly consists of a frame 5, a turntable 6 mounted on said frame 5, provided with tightening elements 7, in particular claws, with which the rim 3 of a wheel 8 can be fixed onto said table 6; and a support 9 containing a tool 10 which can be positioned at the height of the top edge 11 of the wheel rim 3, whereby this known tool 10 has a part 12 in which can be provided a lever 13 that can be placed between the top edge 11 and the tire 2, as well as a guiding element 14 for the tire 2.

Figure 6:
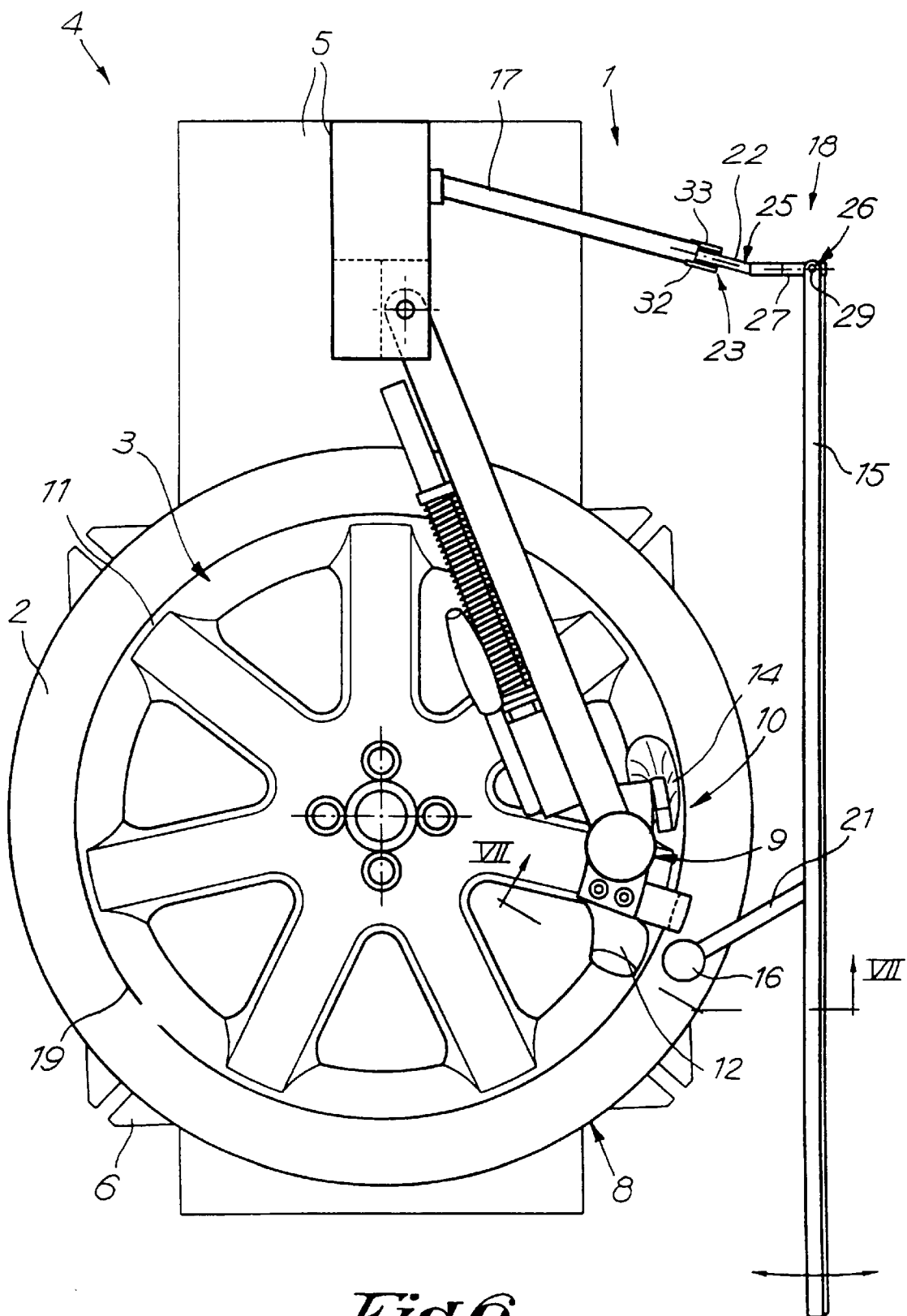
FIG. 6 shows a view analogous to that of FIG. 2, in which the device according to the invention is represented in the position in which it can exert a force on the top bead of the tire.

The device 1 mainly consists of a lever 15 containing a pressure element 16, whereby this lever 15 is fixed to the support 17 in a revolving manner, which is fixed to the frame 5 of the instrument 4 by means of a unique coupling system 18 which makes it possible to move the lever 15 between two positions, namely a first position in which the pressure element 16 can exert a pressure on the top bead 19 of the tire 2 surrounding the wheel rim 3 mounted on the table 6 as represented in FIGS. 6 and 7, and a second position in which the pressure element 16 can exert a pressure on the bottom bead 20 of said tire 2.

The pressure element 16 is a sphere fixed to the lever 15 in an intermediary point by a rod 21.

The above-mentioned support 17 consists of a fixed horizontal arm which points obliquely forward.

In the given example, the coupling system 18 consists of a swivel arm 22, one extremity 23 of which is fixed in a rotating manner around a shaft 24 situated at the free end of the support 17 in the prolongation of said support 17, whereby the lever 15 is coupled to the other extremity 25 of the swivel arm 22 by a universal joint 26.

The universal joint 26 contains two axes of rotation, whereby a first axis consists of a spindle 27 fixed to the extremity of the swivel arm 22 and rotating in an element 28 having a dog point 29 or 30 on two opposite faces, whereby these dog points 29–30 form the second axis and are hinged in the fork 31 provided to this end at the extremity of the lever 15.

The axis formed by the spindle 27 is not parallel to the horizontal axis 24, but is at an angle with the plane of rotation of the swivel arm 22. The axis formed by the dog points 29–30 is practically perpendicular to the above-mentioned axis.

The free end of the support 17 has two stoppers 32–33 in the shape of rods for the swivel arm 22, whereby these stoppers 32–33 are placed such that they restrict the movement of the swivel arm 22 to an angle between 90 and 180 degrees, in particular between a position in which the latter is directed towards the top, as represented by dashed lines in FIGS. 4 and 5, and a position in which it is directed slantingly towards the bottom, as represented in full lines.

It should be noted that the extremity of the spindle 27 containing the element 28 is inclined downwards, whereas the rod 21 is directed upwards as of the lever 15 when the swivel arm 22 touches the stopper 33. This spindle 27 is inclined upwards and the rod 21 downwards when the swivel arm 22 touches the stopper 32.

Moreover, the pressure element 16 is situated more forward or backward, depending on whether the swivel arm 22 touches the stopper 32 or 33. Thus, the pressure element 16 can act on the bottom bead 20 at an ideal spot, whereas the pressure element 16 can act on the top bead 19 without hampering the use of the tool 10.

In rest position, the lever 15 is tilted upward and its extremity rests in a U-seat 34 fixed to the frame 5.

In order to remove a tire 2 from the rim 3 of a wheel 8, said wheel rim 3 is fixed to the turntable 6.

First, one must take the lever 15 and revolve the swivel arm 22 against the stopper 32, put the pressure element 16 against the top bead 19 and push this element down, as represented in FIGS. 6 and 7, which results in that the bead 19 is pushed in the outer groove 35 of the wheel rim 3.

The tool 10 and the lever 13 are simultaneously used in the known manner, which is made easier thanks to the fact that the bead 19 is pushed by the pressure element 16.

The device 1 and in particular the pressure element 16 are used in a similar manner when fitting a tire 2.

According to a variant which is represented in FIGS. 7 and 8 indashed lines, the lever 15 has two pressure elements 16 and 16A, whereby one of these pressure elements 16 can exert a pressure on the bead 19 in a position of the lever 15, whereas the other pressure element 16A can exert a pressure on the other bead 20 in the other position of the lever 15.

Instead of pushing against a bead 19 or 20, the pressure element 16 could also push against a side of the tire 2.

It is clear that the above-described example can undergo numerous modifications while still remaining within the scope of the invention.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A device for fitting and removing a tire to/from a wheel, working in conjunction with an instrument comprising a turntable provided with elements for tightening a rim of the wheel, and with a tool which can be positioned at the height of the top edge of the wheel rim mounted on the turntable, whereby said device comprises:

a lever with at least one pressure element that can exert pressure on either an upper or lower bead and/or a side of the tire, wherein the lever is fixed in a mobile manner to a support which is fixed in relation to the instrument, said support is connected to said lever by a single coupling system which allows for movement of the lever, without detaching the latter, between a first position in which the pressure element can exert pressure on one of the upper or lower beads or the sides of the tire surrounding a wheel rim mounted on the turntable of the instrument, and a second position in which the pressure element can exert pressure on the other bead and/or the sides of said tire.

2. The device according to claim 1, wherein the pressure element is mounted in an intermediary point on the lever by a rod.

3. The device according to claim 1, wherein the coupling system further comprises a swivel arm fixed in a revolving manner to the support, whereby the lever which comprises the pressure element is in turn linked to the swivel arm in a revolving manner.

4. The device according to claim 3, wherein the lever is coupled to the swivel arm by a universal joint.

5. The device according to claim 3, wherein the device is provided with two stoppers arranged to restrict the movement of the swivel arm between two positions, namely a position in which the swivel arm is directed upwards and a position in which the swivel arm is directed slantingly downwards.

6. The device according to claim 5, wherein the stoppers are situated such that the pressure element is situated differently in relation to a contour as defined by one of the beads, depending on whether the swivel arm is situated in any of the two above-mentioned positions, so as not to hamper the use of the tool.

7. The device according to claim 2, wherein the coupling system is made such that an angle of the rod in relation to the turntable is different for said two lever positions.

8. The device according to claim 3, wherein the lever with the pressure element is coupled to the swivel arm in a revolving manner around an axis of rotation situated at an angle in relation to the plane of rotation of the swivel arm.

9. The device according to claim 1, wherein the lever has two pressure elements, whereby one of the pressure elements is arranged to exert a pressure on a bead or side when the lever is in one position, whereas the other pressure element is arranged to exert a pressure on the other bead or side when the lever is in the other position.

* * * * *